United States Patent
Chi et al.

(10) Patent No.: US 9,015,162 B2
(45) Date of Patent: Apr. 21, 2015

(54) INTEGRATING SMART SOCIAL QUESTION AND ANSWERS ENABLED FOR USE WITH SOCIAL NETWORKING TOOLS

(71) Applicant: International Business Machines Corporation, Armonk, NY (US)

(72) Inventors: Chang Y. Chi, Beijing (CN); Qinying Liao, Beijing (CN); Lin Luo, Beijing (CN); Jeffrey W. Nichols, San Jose, CA (US); Ying-xin Pan, Beijing (CN); Thomas Schaeck, Achern (DE); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/750,301

(22) Filed: Jan. 25, 2013

(65) Prior Publication Data
US 2014/0214831 A1    Jul. 31, 2014

(51) Int. Cl.
*G06F 17/30* (2006.01)
*G06Q 50/00* (2012.01)
*G06Q 10/10* (2012.01)

(52) U.S. Cl.
CPC .......... *G06Q 50/01* (2013.01); *G06F 17/30654* (2013.01); *G06Q 10/10* (2013.01)

(58) Field of Classification Search
CPC .................. G06F 17/30598; G06F 17/30654; G06F 17/3064; G06Q 50/01
USPC .............. 707/737, 754, 713, E17.068, 999.01
See application file for complete search history.

(56) References Cited

U.S. PATENT DOCUMENTS

| | | | |
|---|---|---|---|
| 6,701,309 B1 * | 3/2004 | Beeferman et al. .................... 1/1 |
| 8,055,675 B2 * | 11/2011 | Higgins et al. ................ 707/769 |
| 8,423,392 B2 * | 4/2013 | Moxley et al. ............... 705/7.14 |
| 8,468,143 B1 * | 6/2013 | Oztekin et al. ................ 707/706 |
| 8,515,888 B2 * | 8/2013 | Ventilla et al. .................... 706/45 |
| 8,516,379 B2 * | 8/2013 | D'Angelo et al. ............ 715/751 |
| 8,538,821 B2 * | 9/2013 | Nguyen et al. ............... 705/7.32 |
| 8,589,235 B2 * | 11/2013 | Moxley et al. ............. 705/14.73 |
| 2001/0047355 A1 * | 11/2001 | Anwar .............................. 707/5 |
| 2001/0053968 A1 * | 12/2001 | Galitsky et al. ................... 704/9 |
| 2003/0144994 A1 * | 7/2003 | Wen et al. .......................... 707/3 |
| 2003/0227479 A1 * | 12/2003 | Mizrahi et al. ................ 345/753 |
| 2008/0294637 A1 * | 11/2008 | Liu ................................. 707/6 |

(Continued)

OTHER PUBLICATIONS

Bian et al., "Finding the Right Facts in the Crowd: Factoid Question Answering over Social Media", WWW 2008, Apr. 21-25, 2008, Beijing, China, pp. 467-476.*

(Continued)

*Primary Examiner* — Phuong Thao Cao
(74) *Attorney, Agent, or Firm* — Cantor Colburn LLP; Libby Toub

(57) ABSTRACT

Embodiments include a program product and a method for providing responses to questions provided on a social media site. The method includes receiving, via a processor, a user question from a social networking site and decomposing and filtering the user question so that it can be further analyzed. The method also includes generating a list of most closely matched potential responders based on analysis of the user question and sending the most closely matched potential responders the user question. Upon receiving responses back from the most closest matched potential responders, these responses are aggregated by the processor in a final response format.

20 Claims, 3 Drawing Sheets

(56) References Cited

U.S. PATENT DOCUMENTS

| | | | |
|---|---|---|---|
| 2008/0311934 A1* | 12/2008 | Soderstrom | 455/466 |
| 2009/0019060 A1* | 1/2009 | Beckerman et al. | 707/10 |
| 2009/0077037 A1* | 3/2009 | Wu et al. | 707/3 |
| 2009/0307100 A1* | 12/2009 | Nguyen et al. | 705/26 |
| 2010/0030769 A1* | 2/2010 | Cao et al. | 707/5 |
| 2010/0131265 A1* | 5/2010 | Liu et al. | 704/9 |
| 2010/0145976 A1* | 6/2010 | Higgins et al. | 707/765 |
| 2010/0168716 A1* | 7/2010 | Von Weymarn-Scharli | 604/524 |
| 2010/0235311 A1 | 9/2010 | Cao et al. | |
| 2011/0106746 A1* | 5/2011 | Ventilla et al. | 706/50 |
| 2011/0212430 A1* | 9/2011 | Smithmier et al. | 434/322 |
| 2011/0238763 A1* | 9/2011 | Shin et al. | 709/206 |
| 2011/0246465 A1* | 10/2011 | Koister et al. | 707/737 |
| 2011/0246910 A1* | 10/2011 | Moxley et al. | 715/758 |
| 2012/0059816 A1 | 3/2012 | Narayanan et al. | |
| 2012/0060106 A1* | 3/2012 | Moxley et al. | 715/758 |
| 2012/0166457 A1* | 6/2012 | Ross et al. | 707/755 |
| 2012/0173566 A1* | 7/2012 | D'Angelo et al. | 707/769 |
| 2012/0173992 A1* | 7/2012 | D'Angelo et al. | 715/751 |
| 2012/0185484 A1* | 7/2012 | Jones et al. | 707/740 |
| 2012/0252497 A1* | 10/2012 | Altscher | 455/456.3 |
| 2012/0291137 A1* | 11/2012 | Walsh et al. | 726/26 |
| 2013/0151347 A1* | 6/2013 | Baldwin et al. | 705/14.66 |
| 2013/0166526 A1* | 6/2013 | Moxley et al. | 707/706 |
| 2014/0006524 A1* | 1/2014 | Singh et al. | 709/206 |
| 2014/0030688 A1* | 1/2014 | Lolli et al. | 434/350 |
| 2014/0137001 A1* | 5/2014 | Baldwin et al. | 715/753 |
| 2014/0207794 A1* | 7/2014 | Du et al. | 707/748 |

OTHER PUBLICATIONS

Mori et al., "Answering any Class of Japanese Non-Factoid Question by Using the Web and Example Q&A Pairs from a Social Q&A Website", 2008 IEEE/WIC/ACM International Conference on Web Intelligence and Intelligent Agent Technology, 2008, pp. 59-65.*

Nichols J., "Using Public Social Media to Find Answers to Question", 2013, pp. 1-3, accessed online at <http://research.microsoft.com/en-us/events/cscw2013smqaworkshop/nichols.pdf> on Dec. 5, 2014.*

Tang et al., "Towards Interactive QA: Suggesting Refinement for Questions", SIGIR Workshop on "Entertain Me": Supporting Complex Search Tasks, Jul. 28, 2011, Beijing, China, pp. 13-14.*

* cited by examiner

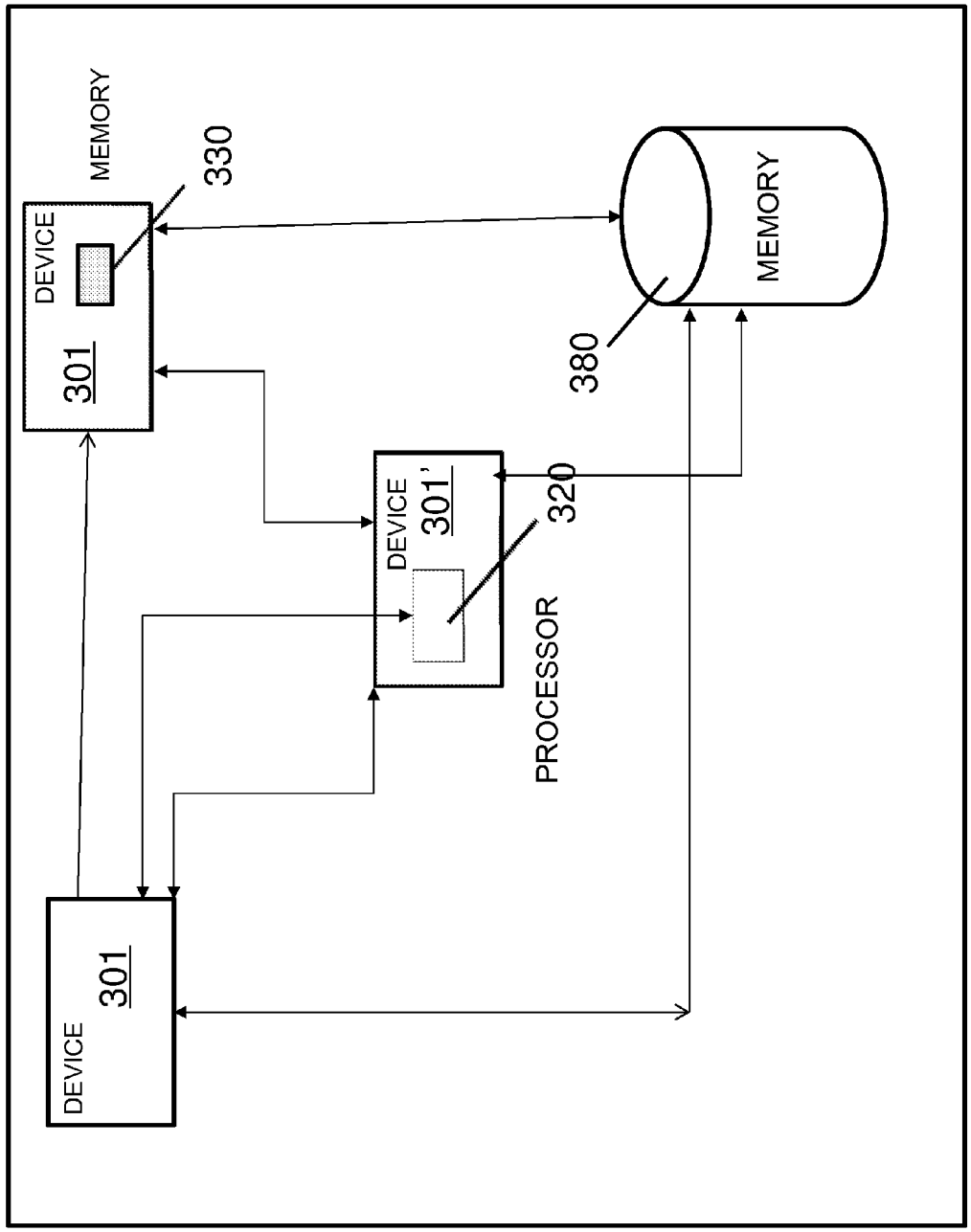

INTEGRATING SMART SOCIAL QUESTION AND ANSWERS ENABLED FOR USE WITH SOCIAL NETWORKING TOOLS

BACKGROUND

The present disclosure relates generally to social networking and in particular to integrating smart social questions and answers enabled for use with social networking tools.

Social Networking is a recent phenomenon that has been helped tremendously with the advent of wireless technology and on-line services such as mobile devices and the Internet. A social networking group is similar to an online community with a group of individuals as its members, that often have a particular need or specific interest. Social networking is often made possible by a social networking service. A social networking service is an online service, platform, or site that focuses on facilitating the building of relationships among people who share common interests, activities, backgrounds, or real-life connections. Most social networking services build a user profile or other representation that identifies a particular user with some specificity. These profiles can vary but often provide additional information about the user such as gender, age, and social links. Most social network services are web-based and provide means for users to interact over the Internet such as through electronic mail (e-mail) and instant messaging. However, the popularity of mobile devices has not only enabled web-based connectivity but also has helped with the development of applications that may provide mobile connectivity through other subscription means.

Social networking websites are known as social sites and often function like an online community. Once access is provided to a social networking website, the members begin socializing and exchanging ideas and pose questions and answers. Social networking sites allow users to share ideas, activities, events, interests and at times provide a neutral forum to ask questions and receive answers from a large cross section of the population anonymously, if desired.

In recent years, social networking websites have also been used to interconnect employees of a particular company so that they can share ideas and solve problems. In addition, open communities have taken advantage of such websites to identify potential problems and help resolve them. Examples can include user groups, open source software developer communities or other relationships that are established around connecting customers and merchants/service providers.

BRIEF SUMMARY

Embodiments include a program product and a method for providing responses to questions provided on a social media site. The method includes receiving, via a processor, a user question from a social networking site and decomposing and filtering the user question so that it can be further analyzed. The method also includes generating a list of most closely matched potential responders based on analysis of the user question and sending the most closely matched potential responders the user question. Upon receiving responses back from the most closest matched potential responders, the responses are aggregated by the processor in a final response format.

In an alternate embodiment, another method includes detecting a question submitted via a user to a social networking site via a processor. The processor decomposes and filters the user originated question and suggests a different question format. Refinement options are provided to allow the user to modify the question. In addition, a recommended list of responders are provided to the user and if these responders are selected the question is then forwarded to them.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 3 depicts a block diagram showing a network of devices in processing communication with one another in accordance with an embodiment.

DETAILED DESCRIPTION

In many instances, a forum that provides an ability for a question and answer (hereinafter referred to as "Q&A's") session provide the best and most cohesive manner of learning. Such open exchanges also help establish both real and on-line communities. The one advantage of Q&A type of information seeking over written documentation or even film is that Q&A's provide a dynamic interchange between the parties. Such interchanges may start at a rudimentary level but quickly builds up in complexity such that the full exchange provides a comprehensive and sophisticated exchange of information. Q&A's also help provide a quick understanding of difficult concepts that may seem too cumbersome by studying texts alone. In addition, in many instances text and static documentation only present a certain perspective that is limited and may leave crucial information out. Furthermore, certain type of knowledge may not always be recorded and only provided through dynamic interchanges. Collective input, especially when performed on a dynamic basis, can also lead to a type of brainstorming and learning that is not possible through other means. Successful Q&A's through a social website (hereinafter social Q&A's) provide an informal way to help connect those with questions and their responders and help form, raise awareness of, and develop communities. In addition such opportunities can also help raise the expertise level of an entire organization.

Unfortunately, there are challenges associated with providing meaningful social Q&A's that help achieve optimal results. While social websites allow Q&A's in a more effective way as they engage and leverage a larger population, the websites are often limited in scope of information as most are categorized by certain criteria. Users with a particular question have to use different channels and it is difficult to provide a cross channel and cross platform search. Traditional ways of asking a question is limited by a user searching individually and posing the question on a one-on-one basis on different forums. For example, a user with a question about travelling with small infants to a theme park may have to post a question in a parenthood website, in a travel website, on the community section of the theme park's own website, on a website dedicated to a hotel or an airline and the like, prior to obtaining a comprehensive or at least adequate response.

Figure 1:
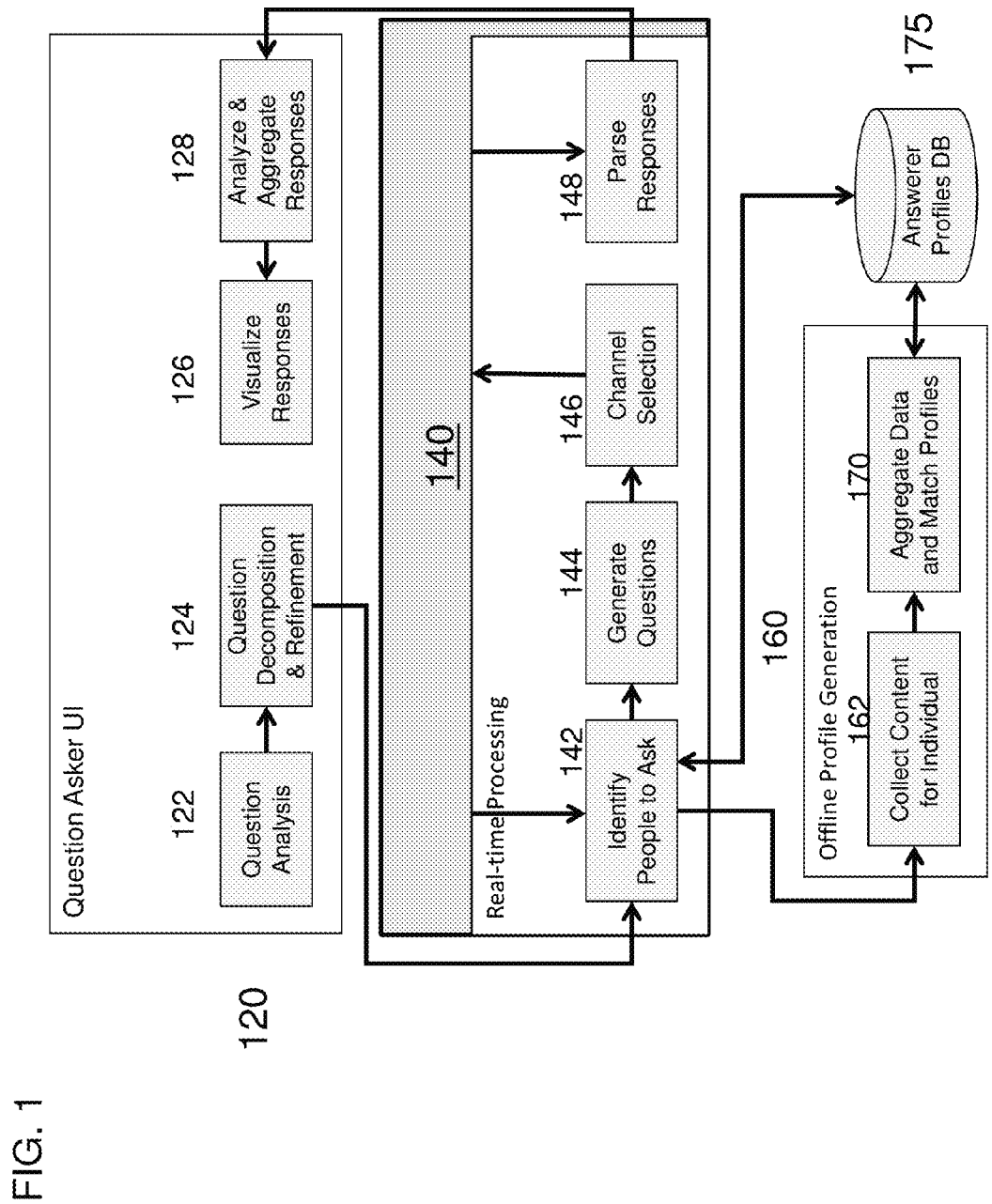
FIG. 1 depicts a flow process for an integrated smart question and answer session in accordance with an embodiment.

FIG. 1 is a flow process diagram according to one embodiment of the present invention. In this embodiment, as will be discussed, a user can ask a question using any web-based service or mobile application through a wireless device, a computer or other means as can be appreciated by those skilled in the art and receive a cross platform comprehensive response. The user may be interacting with the network through a certain personal device which can be designated as a processor that manages the data handling. In that case, the processor will act as a manager for receiving the question and eventually disseminating a response back to the user. In alternate embodiments, a manager can be a processor associated with subscription or other service provider that monitors one or more questions posed by any user in a network. In such a case, the processing manager (also hereinafter referenced as manager or application manager) is not residing in any personal device associated with the user. The network can be defined, in one embodiment, as a series of other digital devices in processing communication with one another.

In either case, in one embodiment, the users can post questions at any point during any social networking activity and still receive synthesize answers from various sources. Examples of social networking activities during which Q&A's can occur, includes but is not limited to during posting on a board/wall, microblogging, blogging, forum posts and others. In one embodiment, a method is provided that includes gathering the questions, analyzing the questions, routing the questions to the appropriate forum or individuals/entities and communities, as well as similar activities associated with analyzing and synthesizing answers from such various sources.

Referring back to FIG. 1, by way of example as shown at 120, a question can be posed by the user in any form as discussed. The question can be posed using text, voice commands, images or any other means. The question is then analyzed as shown at 122. The analysis can include, in one embodiment, the decomposition and further and further refinement of the question such as to its root elements as shown at 124. In one embodiment, the decomposition can also include transforming the question from one form into another. For example, a question posing through a voice command may then be transformed into text.

Once the question is appropriately ready for posing and in an optimal format, it can then be dynamically presented and a response also dynamically received and shared with the user who originally posed the question. In one embodiment, the question can be generally broadcast to all who are in processing communication or filtered through some prior criteria. For example, a list of prior responders with most useful information about a certain topic can be accumulated through time and stored in a memory device or location. Alternatively, after the question is analyzed a number of key words can be selected to match the question with all relevant forums and social websites that are available that may pertain to the question. In one embodiment, the question can be sent to a select group of users or through channel selections as seen respectively at 142 and 146. In one embodiment, different or complementary questions may also be posed and provided by the application to provide a more comprehensive answer. This is demonstrated at 144.

Once the questions have been forwarded or sent appropriately, responses are then received and also parsed also on a real-time processing basis as shown at 148. The parsed responses are then analyzed and aggregated and their collective result is then provided back to the user who had posed the question as shown at 128. Responses in other medium such as those for example that resemble visual responses are also parsed, analyzed and prepared in the same or other forms (i.e. written word) back to the user in an optimal form. In one embodiment, the response is provided to the user in the same format that the question was posed. For example, a question asked using a voice command will be provided back to the user through speech. By contrast a visual question will receive a visual formatted response. In an alternate embodiment, the user can provide the question in one form and elect to receive the response in another form.

In one embodiment, as shown in 160, a profile generation can be made possible. The profile generation can include the storing of responses for one or more users. The responses are aggregated prior to storing for later usage. This can be identified as for each individual as shown at 162 or in general and provided to those that match a certain profile (at any point) characteristic for their benefit even when a question is not directly asked. In addition, a database of those who provided responses can also be aggregated and stored as shown at 170 for later usage. This database can be then used at a later time to help identify individuals that can be solicited for a response (see 142). This allows users to ask questions anywhere and get faster and better answers through smart social Q&A technologies. The traditional approaches either deal with questions posted during social networking activities "passively" or require users to use a dedicated site (e.g., a social Q&A site to post questions and receive answers).

In one embodiment, questions can be collected by providing multiple channels on line such as by allowing the question to be asked using a search bar, or directly while microblogging or through a forum. In addition, one function of analysis element 124 is to determine when users are asking incomplete or ambiguous questions or questions that may not be seen by suitable responders. In such a case, the question is refined to provide appropriate results. In one embodiment, question collection is made possible via a variety of manners such as via a search directly or via forum posts, status updates, or homepage guides. In addition, questions can be posed in a central location for reviewing all Q&As. Other examples can include question analysis and pre-processing through interactive context refinement, question decomposition and rephrasing. The aggregate database can be stored in a memory location that can also establish such responder profiles in a database 175 for later use.

In one embodiment, one function of the methodology is to analyze and match when multiple responders are providing the answers. The answers can come through a single forum or be collected through multiple social networks. In either case, the answers are synthesized so that similar information is not presented several times to the user but rather aggregated and presented cohesively. In other words, answers provided by multiple responders are filtered so that there are no redundancies in the final presented response. Additional information, however, is compiled from different sources to provide a comprehensive aggregated response. On the other hand, conflicting information is also aggregated and provided as such to the user who had asked the question as an alternate viewpoint or solution. In this manner, the user becomes aware that there is more than one answer and some may come be conflicting.

Both questions and responses can come from a variety of sources including but not limited to activity streams, forums, electronic mail, or any other channel. Using the present smart social Q&A scheme provides an informal way to connect people and develop communities through multiple channels.

Collecting questions and responses from various channels in processing connection, allows the building of broader communities. One advantage is to establish engaged individuals through a broad spectrum and social networks by synthesizing and "broadcasting" questions and answers when appropriate.

In one embodiment, natural language processing (NLP) model is used. NLP is a term used to describe any abstracted set of inputs to a text analysis engine so that it might extract concepts and relationships between those concepts. NLP can be used to provide feature extractions so that questions can be presented and responses collected in other medium as discussed such that a question can be asked or responded to orally using a mobile device or other technological means. Another advantage provided by feature extraction with NLP technologies is to enable easier searching such as by labeling parts of speech or other dictionary relevant characteristics. In one embodiment, characteristic classification can be performed such as with machine learning algorithms. To help aid understanding, let us consider a few examples.

In a first example, a user may ask something like "Who knows the details of SAFE (E&U solution)?" The question is then parsed such as by predicted type: About product/solution. In a second example, a different question is asked "I do not have the upgrade folders option—what do I do next? Under actions—folder options there are no options available. I am in the inbox view and this is not available." In this example the predicted type is defined as Troubleshooting of SW (software).

The purpose of question analysis evaluation is to reduce the potential number of turns of interaction between the askers and responders by evaluating the quality of questions. In one embodiment, a template-based approach can be implemented to calculate distance of the question and the formal template of that type. Turning back to the second example where the predicted type was indicated as "Troubleshooting of SW", the question analysis (refinement and decomposition) may need to interact further with the user to establish context refinement and decomposition. For example, in this example where more than one usage can be envisioned, the user may have to further clarify the type and purpose of the question. In other examples, there may be additional questions to fill in any missing contexts or alternatively to confirm if there is additional fine tuning that can be achieved through other sub-questions. In the first example, the question "Who knows the details of SAFE (E&U solution)?" could then lead to sub-questions that may be geared to a particular cross section. In this context, if the question is to be geared for marketing people, then a follow-up may be "what are the reference cases for SAFE" whereas, if the cross sections are to be addressed to a system architect a sub-question may be "what is the technical advancement of SAFE".

Figure 2:
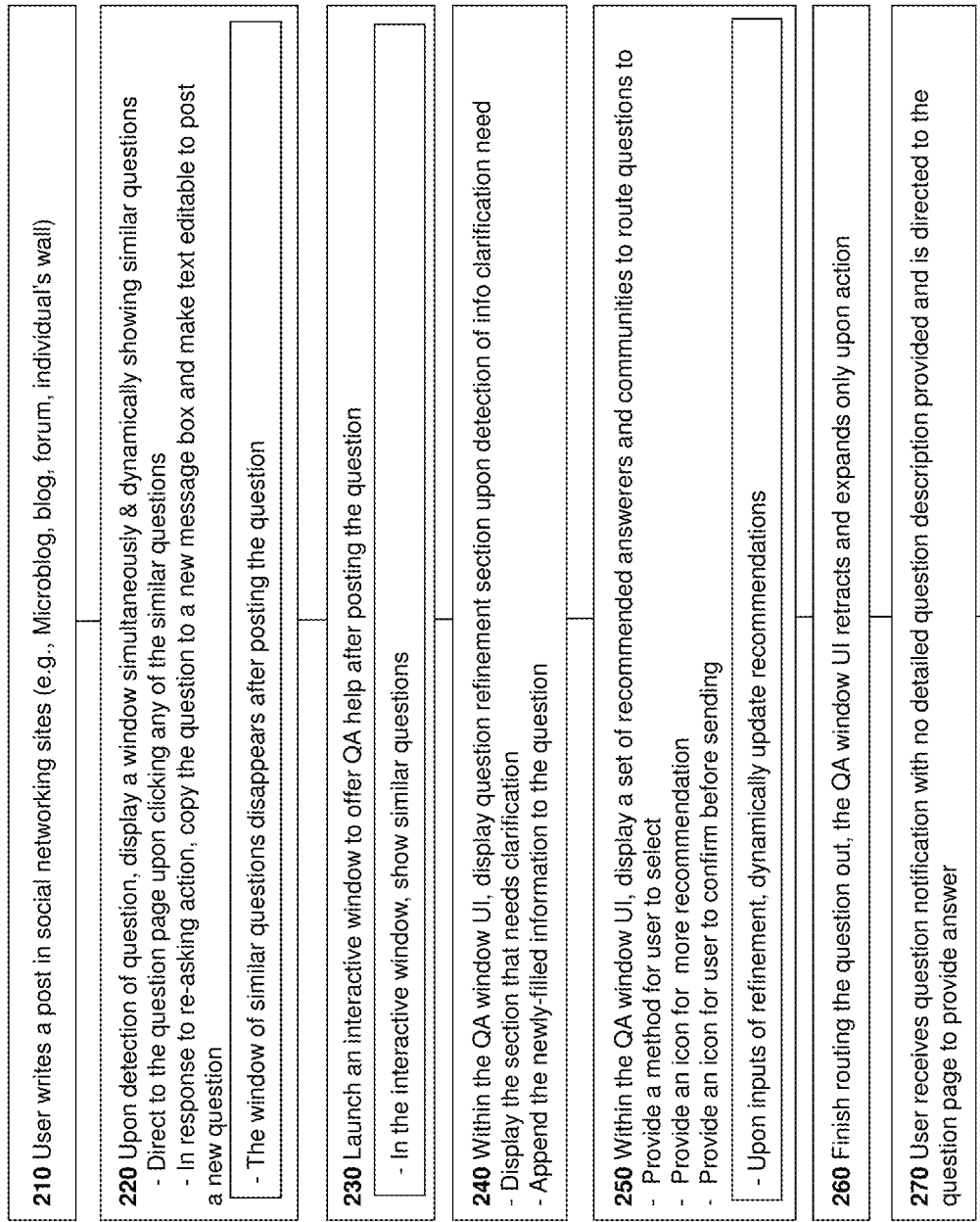
FIG. 2 depicts a flow process for an integrated smart question and answer session in accordance with an alternate embodiment.

FIG. 2 provides an alternate flow diagram for another embodiment of the present invention. As indicated in block 1 at 210 the user writes a question at any social networking site through one or more services discussed such as but not limited to microblogging, blogs, forums, individual walls etc. The question is detected by a processor acting as an application manager. In one embodiment, a window is then simultaneously and dynamically opened as seen in block 220. In one embodiment, the window can display similar questions that may be used either to verify understanding and concept of the original question, or alternatively provide a similar question that has been already asked to which a response resides in a memory or storage location. In one embodiment, if the latter is the case, the user can be then directed to locations (pages etc.) where similar questions are displayed. If desired, one of the display options indicating the same or similar questions can be then selected such as by clicking. The similar or same question can then be copied automatically to a new message box and edits can be made to it by the user. Once satisfied, the question can then be sent or posted and the window of similar questions will then disappear after posting the question.

In block 230, an interactive window can then be launched if desired to offer Q&A help after posting the question. This can include, for example, similar questions and their previous responses provided (or aggregated) historically. In block 240, within the Q&A window displayed a question refinement window can also be displayed to further clarify the question if such is needed. This window can appear at any point prior to posting as well or alternatively if needed prior to responses are gathered. Either sections or entire question may need additional information clarification and this is provided selectively. The newly provided information is then automatically appended to the original question, in one embodiment, prior to dissemination.

In block 250, the display window then also provides a set of recommended answers such as from information gathered previously, and displays recommended communities to which the question may be routed. In alternate embodiments, whether dealing with block 250 or prior interactive windows provided in the previous blocks and as can be appreciated by those skilled in the art, a variety of methods can be provided to interact with the user further. For example, an icon can be provided to ask for more recommendations or an icon or other selection methodology can be provided to confirm the sending or broadcasting of the question. In block 250, the user can also deselect elections so that if the user does not wish the question to be broadcast to a community that would be an option. Any input provided by the user at any point after final selection is made, would then be dynamically updated prior to broadcast or sending of the question.

In one embodiment, as provided in block 260, the question is then routed and any user interface is retracted and will not be opened again except upon action. In block 270, in one embodiment, the user can receive a question notification submission or alternatively receipt (such as from other users asking new or commenting on the posed question). In one embodiment, the notification is brief and there is no description provided unless selectively opted by the user to be directed to question page to view the additional information, ask or provide a response or further answer other questions or comments.

FIG. 3 is a block diagram illustration of a computing environment as per one embodiment of the present invention having a facilitated network system. As illustrated in FIG. 3, the system comprises a plurality of devices 301 that are in processing communication with one another. This communication can be enabled through wired or wireless processing or other alternate means as can be appreciated by those skilled in the art. Each device 301 can also include one or more processors 320. Each device 301 can include its own internal memory as shown at 330, or be in processing communication with that device's internal memories, or in communication with one or more external memories such as the one shown in FIG. 3 at 380. The system memories 330 and 380 can also be in communication directly with one another or through the node and either be comprised of a single unit that is shared among the many devices 301 or be comprised of a plurality of components that are in processing communication with one another. In this manner, each device 301 can either exclusively use a single memory or alternatively use multiple memories at the same time or at different times to achieve processing optimization.

In addition, the processing means through which the devices 301 are in communication with one another are varied as can be appreciated by those skilled in the art. For example, in one embodiment, one or more devices 301 can be in processing communication with one another using the Internet or world wide web but in other embodiments they can be part of a secured and privatized network. Each device 301 can represent a variety of digital devices, such as but not limited to mobile devices, personal computers, servers or others such devices can further include display, input/output interfaces, printers or other components as can be appreciated by those skilled in the art.

In one embodiment, each device 301 is configured and enabled to either have direct processing ability or manage processing ability through access to other devices such that when questions are received, the analysis can be completed by the device or by processing the question using other devices networked to the originator device. This device or processor will then be designated as a manager as shown as 301' as per example. Questions are then disseminated through the network via this manager, using one or more memories as appropriate. Received responses can then be also analyzed by the originator device, through one or more processor and applications, or by accessing to other processors in other devices. Again one or more storage devices can be accessed to store or retrieve information.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   detecting via a processor, a question from a user at a social networking site;
   based on detecting the question, assisting the user in defining a user question, the assisting including:
   opening a window for displaying, via a user interface, a plurality of questions including the detected question and at least one additional question;
   detecting a selection, by the user, of one of the plurality of questions displayed in the window;
   copying the selected one of the plurality of questions into a new message block; and
   updating the selected question in the new message block based on edits received from the user, the updating resulting in the user question;
   decomposing and filtering, by said processor, said user question so that it can be further analyzed;
   generating a list of most closely matched potential responders based on analysis of said user question;
   sending to said most closely matched potential responders said user question; and
   upon receiving responses back from said most closely matched potential responders, aggregating said responses by said processor into a final response.

2. The method of claim 1, wherein said list of most closely matched potential responders is generated by searching a plurality of social networking sites and said final response is communicated back via said processor to said user.

3. The method of claim 1, wherein aggregating said responses into said final response includes filtering similar responses received so that information is not duplicated.

4. The method of claim 3, wherein said user question is received in a format captured in a first medium.

5. The method of claim 4, wherein said final response is communicated back to said user in a format captured in said same first medium.

6. The method of claim 5, wherein said final response is communicated back to said user in a format captured in a second medium selected by said user.

7. The method of claim 2, wherein said final response is stored in a memory device.

8. The method of claim 7, further comprising searching said memory device for previously aggregated received responses to similar questions prior to presenting said final response back to said user.

9. The method of claim 7, wherein the list of most closely matched potential responders to said user question is accumulated and stored in said memory device.

10. The method of claim 9, wherein said list of most closely matched potential responders are selected by accessing a list of all previous responders, stored in said memory device, that have responded to prior similar questions.

11. A method comprising:
    detecting a question submitted via a user to a social networking site via a processor;
    based on detecting the question, assisting the user in defining a user question, the assisting including:
    opening a window for displaying, via a user interface, a plurality of questions including the detected question and at least one additional question;
    detecting a selection, by the user, of one of the plurality of questions displayed in the window;
    copying the selected one of the plurality of questions into a new message block; and
    updating the selected question in the new message block based on edits received from the user, the updating resulting in the user question;
    decomposing and filtering, by said processor, said user question so it can be further analyzed;
    suggesting said user question in a different question format to said user based on further analysis of said user question;
    providing a refinement option to said user for modifying said user question once a suggestion for changing question format is made;
    recommending that said user question after refinement be sent to a list of suggested responders;
    sending said user question, based on acceptance of said user, to said list of suggested responders.

12. The method of claim 11, wherein said user question is detected by a processor using an electronic device.

13. The method of claim 12, further comprising allowing said user to select additional responders.

14. The method of claim 13, wherein said processor receives and aggregates any responses.

15. The method of claim 14, wherein similar questions previously posted on said social networking site are searched and provided to said user.

16. The method of claim 15, wherein said user resubmits one of said similar questions previously posted on said social networking site.

17. The method of claim 16, wherein said user can select to edit said similar question previously posted on said social networking site.

18. The method of claim 15, wherein said user can select to view previous responses provided to said similar questions previously posted on said social networking site.

19. The method of claim 13, wherein said user can add or modify said list of suggested responders.

20. A computer program product for generating a social question and answer process, the computer program product comprising a non-transitory computer readable storage medium having computer readable program code embodied therewith, said computer readable program code being executable by a computer to:
   detect a question from a user at a social networking site;
   based on detecting the question, assist the user in defining a user question, the assisting including:
      opening a window for displaying, via a user interface, a plurality of questions including the detected question and at least one additional question;
      detecting a selection, by the user, of one of the plurality of questions displayed in the window;
      copying the selected one of the plurality of questions into a new message block; and
      updating the selected question in the new message block based on edits received from the user, the updating resulting in the user question;
   decompose and filter said user question via a processor so that it can be further analyzed;
   generate a list of most closely matched potential responders based on analysis of said user question;
   send to said most closely matched potential responders said user question ; and
   upon receiving responses back from said most closest closely matched potential responders, aggregate said responses by said processor into a final response format.

* * * * *